(12) United States Patent
Prieto et al.

(10) Patent No.: US 7,705,885 B2
(45) Date of Patent: Apr. 27, 2010

(54) IMAGE AND VIDEO MOTION STABILIZATION SYSTEM

(75) Inventors: Yolanda Prieto, Miami, FL (US); Zhongli He, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 916 days.

(21) Appl. No.: 11/424,278

(22) Filed: Jun. 15, 2006

(65) Prior Publication Data

US 2007/0291127 A1  Dec. 20, 2007

(51) Int. Cl.
*H04N 3/18* (2006.01)
*H04N 5/227* (2006.01)

(52) U.S. Cl. .................................. 348/208.99

(58) Field of Classification Search ............ 348/208.99, 348/208.1–208.13
See application file for complete search history.

(56) References Cited

U.S. PATENT DOCUMENTS

| 5,291,300 | A  | * | 3/1994 | Ueda ...................... 348/208.99 |
| 7,221,776 | B2 | * | 5/2007 | Xiong ................... 348/E5.046 |
| 2005/0030302 | A1 | * | 2/2005 | Nishi et al. ................. 345/204 |
| 2005/0110907 | A1 | * | 5/2005 | Jung .......................... 348/193 |
| 2007/0002146 | A1 | * | 1/2007 | Tico et al. ................ 348/208.1 |

OTHER PUBLICATIONS

H.R. Pourreza, M. Rahmati and F. Behazin; An electronic Digital Image Stabilizer Based on Stationary Wavelet Transform (SWT), IEEE 2003 pp. 383-386.
Yu-Chun Peng, Hung-An Chang, Chia-Kai Liang, Homer Chen; "Integration of Image Stabilizer with Video Codec for Digital Video Cameras" Graduate Institute of Communication Engineering National Taiwan University Taipei, Taiwan 2005 IEEE pp. 4871-4874.

* cited by examiner

*Primary Examiner*—Gevell Selby
(74) *Attorney, Agent, or Firm*—Gary R. Stanford

(57) ABSTRACT

A motion stabilization system including a filter bank and motion stabilization logic. The filter bank receives a video signal and provides at least one high frequency sub-band signal which includes edge information of the video signal. The motion stabilization logic receives the high frequency sub-band signal, a reference image, and the video signal and provides a stabilized image. The reference image is generated from image stabilization information developed during motion processing. The motion stabilization system may include an edge detector which receives and binarizes the high frequency sub-band signal. Binarization significantly reduces the amount of information to be processes by the motion stabilization logic. The motion stabilization system may further include a tile buffer which stores a portion of the video signal and which provides a video signal portion to the filter bank. The filter bank may be implemented as a discrete wavelet transformation filter.

22 Claims, 3 Drawing Sheets

IMAGE AND VIDEO MOTION STABILIZATION SYSTEM

BACKGROUND OF THE INVENTION

1. Field of the Invention

The present invention relates in general to video motion stabilization, and more specifically to an image and video motion stabilization system for providing reliable camera jitter control.

2. Description of the Related Art

The need for reliable camera jitter control is increasing as users are demanding that the picture in the viewfinder and the captured image or video both appear stable. Camera jitter control algorithms attempt to distinguish movement of the camera itself from movement within the scene being captured to provide a stable viewing display and to significantly reduce or eliminate the camera motion during capture. The conventional approach to camera jitter either requires storing the complete frame for more accurate motion vectors, so that the amount of memory needed for higher resolution camera equipment becomes prohibitive, or uses reduced memory space with less computational overhead, so that the quality of image stabilization is degraded. Existing camera jitter stabilization algorithms also often depend on an external motion vector, typically from the encoder block. Such dependency on computations subsequently performed in the processing chain does not allow stabilization of the current frame and does not enable still image capture stabilization.

It is desirable to provide a reliable jitter control with significantly reduced memory requirements and computational complexity for motion estimation while also achieving good stabilization quality. It is also desired to provide a more contained algorithm as part of the image signal processing block which does not depend on subsequent computations to enable stabilization of the current frame and still image capture stabilization.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
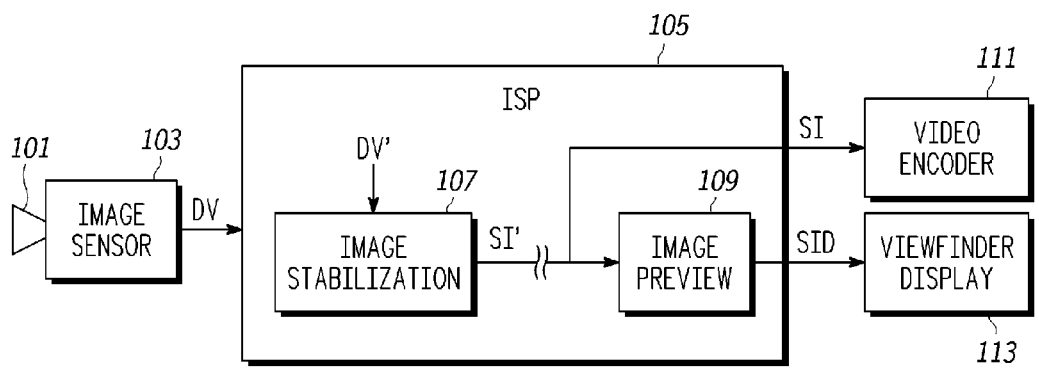
FIG. 1 is a simplified block diagram of an image processing system including an image signal preprocessing (ISP) circuit, which further includes an image stabilization (IS) circuit implemented according to an exemplary embodiment of the present invention.

FIG. 1 is a simplified block diagram of an image processing system 100 including an image signal preprocessing (ISP) circuit 105, which further includes image stabilization (IS) logic 107 implemented according to an exemplary embodiment of the present invention. Input light signals are focused by a lens 101 onto an image sensor 103. The image sensor 103 is any suitable type of device for sensing an image or video as known to those skilled in the art, such as a CMOS (complementary metal oxide semiconductor) array or CCD (charged-coupled device) array or the like. The image sensor 103 outputs a digitized video (DV) signal, which is provided to an input of the ISP circuit 105. The format of the DV signal depends upon the particular type of image sensor 103, such as a raw "Bayer" signal or the like. The ISP circuit 105 performs various signal processing functions on the input DV signal for ultimately providing a stabilized image (SI) signal at a first output to a video encoder 111 and a second stabilized image display (SID) signal at a second output to a viewfinder display 113. The image processing system 100 is configured for a hand-held device or the like, such as a digital camera or video recorder, in which the DV signal typically exhibits jitter from movement of the device. The IS logic 107 operates to distinguish movement of the device itself from movement within the scene being captured to provide a stable viewing display and to significantly reduce or eliminate the device motion to stabilize the captured image. The DV signal is provided to the IS logic 107 as a signal DV' within the ISP circuit 105. In one embodiment, the DV signal is provided directly to the IS logic 107 so that the DV and DV' signals are the same. In other embodiments, the ISP circuit 105 performs preliminary processing functions on the DV signal, so that the DV' signal provided to the IS logic 107 is a modified version of the DV signal. In either case, the IS logic 107 internally outputs a stabilized image (SI') signal. As understood by those skilled in the art, the ISP circuit 105 optionally performs additional processing functions on the SI' signal to provide the output SI signal. The SI signal is also provided to the input of an image preview circuit 109, which processes the SI signal and outputs the SID signal having the desired form and resolution for the viewfinder display 113.

Figure 2:
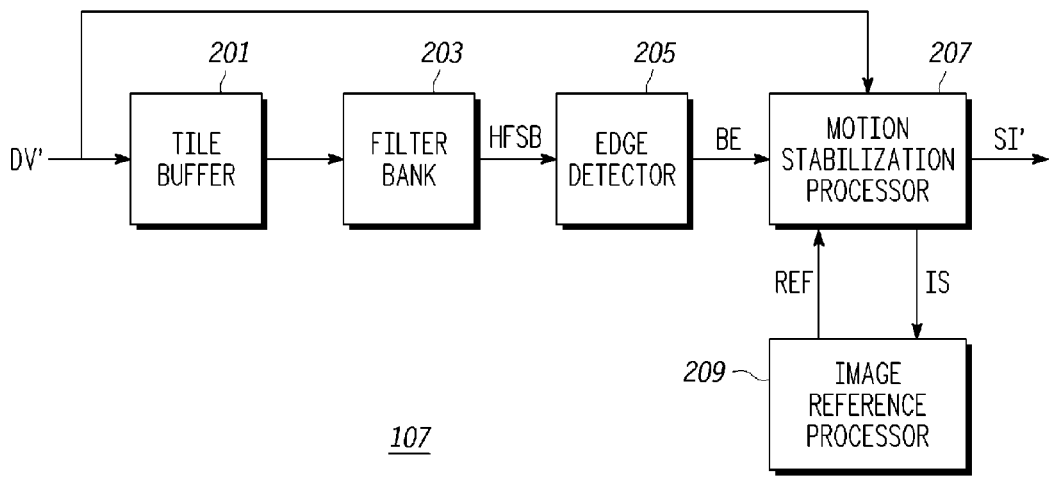
FIG. 2 is a block diagram of the IS logic of FIG. 1 implemented according to an exemplary embodiment of the present invention.

FIG. 2 is a block diagram of the IS logic 107 implemented according to an exemplary embodiment of the present invention. The DV' signal is provided to a tile buffer 201 and to a motion stabilization processor 207. The tile buffer 201 stores a selected portion of each image of the input video signal for purposes of image signal processing. In one embodiment, the tile buffer 201 may be configured to store each picture element or pixel of an entire frame. It is noted, however, that the tile buffer 201 may be configured using relatively expensive memory devices (e.g., registers, static random access memory or SRAM, and the like), so that the tile buffer 201 optionally stores a selected portion of each image. The selected portion includes one or more "tiles" of the image, as further described below. The tile buffer 201 includes multiple line buffers which store the pixels of a certain number of rows of the captured image for providing one or more tiles of information to a filter bank 203. The filter bank 203 outputs a signal HFSB with one or more high frequency sub-bands containing high frequency edge information of the image. The HFSB signal is a decimated image which reduces image processing but which retains sufficient edge information of the image for purposes of stabilization.

In the illustrated embodiment, the HFSB signal is provided to an edge detector 205. The edge detector 205 detects the edges of the captured image contained within the HFSB signal using an edge detection operation, such as a gradient operation or a Laplacian function or the like, and outputs a binaried edge image signal BE to the motion stabilization processor 207. It is noted that the edge detector 205 may also be part of filter bank 203 if the filter bank is specially designed with the function of edge detection. Depending upon the particular configuration, the HFSB signal may be provided directly to the motion stabilization processor 207 (bypassing the edge detector 205). The edge detector 205, however, significantly reduces the computational complexity of motion estimation performed by the motion stabilization processor 207. Also, edge information of an image is known to be very useful and efficient for characterizing the motion of objects. And binarization maintains the edge information while further reducing the amount of data to be processed.

The edge detector 205 detects the edge information and thus binarizes the high frequency image provided by the filter bank 203 to simplify the motion estimation process. There are many methods available for edge detection and image binarization. One method is to compare each pixel of the high frequency image to a pre-determined threshold. If the pixel value is larger than the threshold, it is set to "1" and otherwise it is set to "0". This relatively simple method works because the high frequency image already extracts the edge information from the original image. More complicated methods, such as gradient and Laplacian approaches, can also be used for more accurate edge detection and binarization. The gradient method detects edges by looking for the maximum and minimum in the first derivative of the image, while Laplacian method searches for zero crossings in the second derivative of the image to find edges. Once the high frequency is binarized, the motion stabilization process is significantly simplified which reduces the design cost and complexity. In this manner, the motion estimation is performed on a tile basis for any sized tile (e.g., 16×16, 32×32, etc.), or even on the entire binary image, depending on the particular embodiment and design configuration. It is noted that the larger the binarization image that is used for motion estimation, the more accurate the determination of a Global Motion Vector (GMV) used for image stabilization, as further described below, and thus the more successful the motion stabilization process. Thus, the tile buffer 201 is made as large as possible while maintaining desired cost points for particular configurations.

The motion stabilization processor 207 uses a motion estimation reference (REF) image from an image reference processor 209 and the HFSB or BE signal and performs motion estimation, motion decision and motion compensation for stabilization of the DV' signal. Any suitable motion estimation algorithm may be used for motion detection. In general, the motion stabilization processor 207 generates image stabilization (IS) information which is used for motion compensation to stabilize the image based on the affine transform (or warping). The IS information is provided to the image reference processor 209, which develops and provides the REF image to the motion stabilization processor 207.

Figure 3:
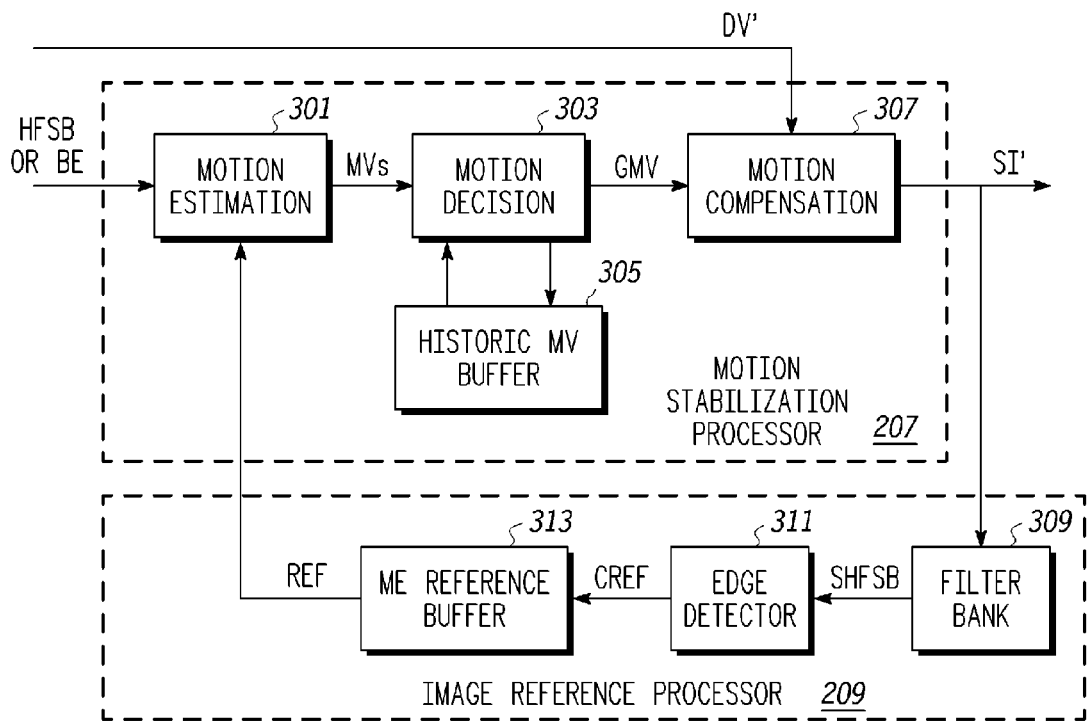
FIG. 3 is a more detailed block diagram of the motion stabilization processor and the image reference processor of FIG. 2 according to one embodiment of the present invention.

FIG. 3 is a more detailed block diagram of the motion stabilization processor 207 and the image reference processor 209 according to one embodiment of the present invention. The HFSB signal (if the edge detector 205 is not used) or the BE signal from the edge detector 205 is provided to motion estimation logic 301, which also receives the REF signal and performs motion estimation. The motion estimation logic 301 outputs multiple motion vectors (MVs) to motion decision logic 303, which generates the GMV from among the MVs for purposes of motion stabilization. The motion decision logic 303 is shown coupled to a buffer 305, which stores historic MVs from prior images. The motion decision logic 303 compares new motion vectors with past motion vectors to identify the GMV used for purposes of stabilization for each image. The motion decision logic 303 attempts to distinguish the motion vectors of moving objects within the scene being captured and determines the desired GMV used for stabilization from the motion vectors of the individual tiles of the input video signal. The GMV determined by the motion decision logic 303 is provided to motion compensation logic 307, which applies the GMV to the DV' signal to determine the SI' signal. It is noted that the GMV is scaled by the appropriate amount depending upon the level of decimation of the filter bank 203. For example, the GMV is scaled up by two in both horizontal and vertical directions if the sub-band images are decimated by two in both directions (e.g., for HH or HL sub-bands).

In the embodiment shown in FIG. 3, the image reference processor 209 includes another filter bank 309 having an input receiving the SI' signal and an output providing a signal SHFSB, which represents a stabilized version of the HFSB signal. Thus, in this case the SI' signal forms the (IS) information from the motion stabilization processor 207. In one embodiment, the filter bank 309 is configured in substantially the same manner as the filter bank 203 to provide high frequency sub-band information of the image of the SI' signal. Thus, the filter bank 309 generally processes the one or more high frequency sub-bands to reduce the amount of information of the SI' signal, so that the SHFSB signal is a decimated version of the SI' signal. Since the SI' signal is a stabilized version of the input video signal (or portion thereof), the SHFSB signal is a stabilized version of the HFSB signal. The SHFSB signal is shown provided to the input of another edge detector 311, which is configured in a similar manner as the edge detector 205. Thus, the edge detector 311 detects the edges of the captured image contained within the SHFSB signal using an edge detection operation, such as a gradient operation or a Laplacian function or the like, and outputs a stabilized binaried edge image signal, shown as a current reference image (CREF) signal. The CREF signal is provided to a motion estimation (ME) reference picture buffer 309, which outputs the REF image as the prior image to the motion estimation logic 301.

In one embodiment, the motion estimation logic 301 compares the prior image contained within the REF signal to a subsequent image contained within the BE signal for determining and updating the MVs. As noted previously, however, the HFSB signal may be provided directly to the motion stabilization processor 207 rather than the BE signal if the edge detector 205 is not provided or used. Also, the SHFSB signal may be provided directly to the ME reference picture buffer 313 as the reference image in which case the edge detector 311 is bypassed or not provided.

Figure 4:
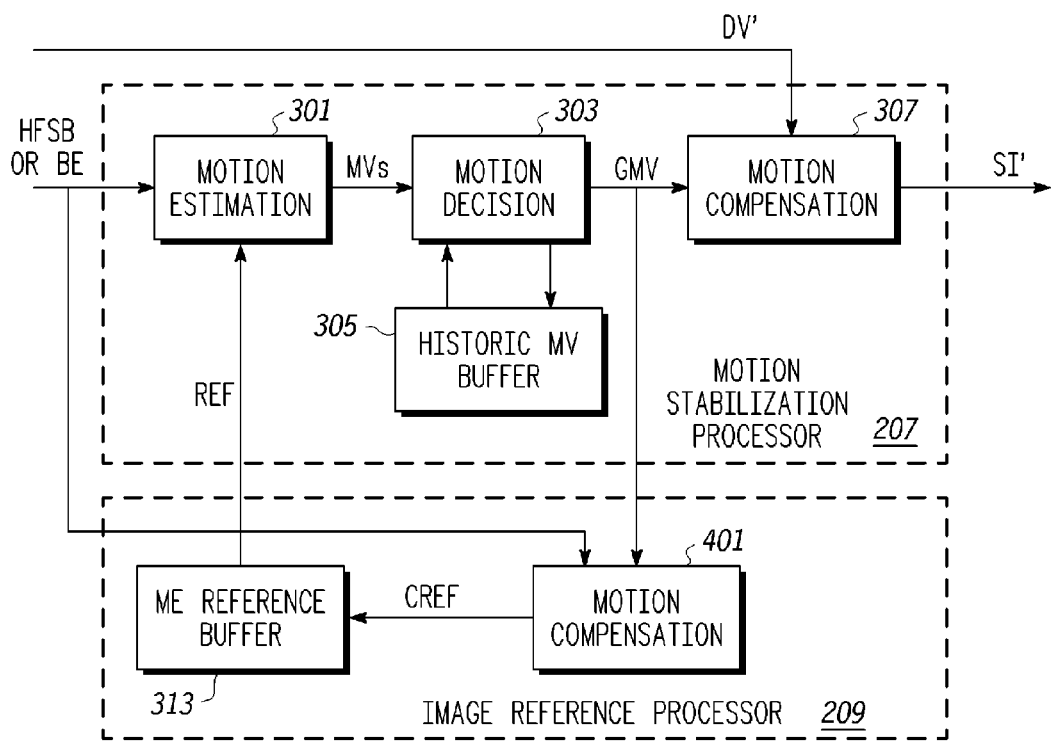
FIG. 4 is a more detailed block diagram of the motion stabilization processor and the image reference processor of FIG. 2 according to an alternative embodiment of the present invention.

FIG. 4 is a more detailed block diagram of the motion stabilization processor 207 and the image reference processor 209 according to an alternative embodiment of the present invention. The motion stabilization processor 207, which includes the motion estimation logic 301, the motion decision logic 303, the buffer 305, and the motion compensation logic 307, is included and operates in substantially the same manner. In this case, however, the image reference processor 209 includes another motion compensation circuit 401, which operates in a similar manner as the motion compensation logic 307. The GMV is provided to the motion compensation circuit 401 as the IS information from the motion stabilization processor 207. Also, the HFSB or the BE signal is provided to the motion compensation circuit 401. The motion compensation circuit 401 applies the GMV to the HFSB or the BE signal (instead of the DV' signal) to determine the CREF signal as the current motion estimation image provided to the ME reference picture buffer 313. Since the GMV is applied to the HFSB signal which has already been filtered and decimated, or to the BE signal which as already been filtered and decimated, edge detected and binarized, additional filtering and binarization is avoided. And as before, the ME reference picture buffer 313 provides the REF signal as the prior image to the motion estimation logic 301, which compares the prior image to a subsequent image for determining and updating the MVs.

Figure 5:
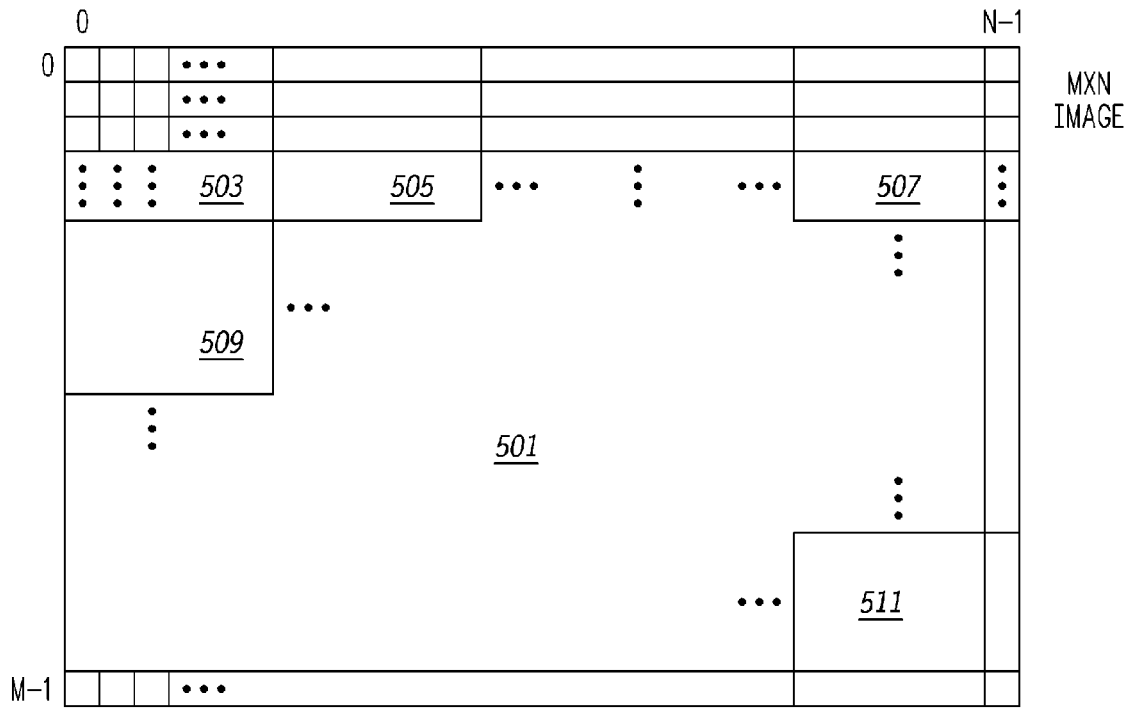
FIG. 5 is a figurative block diagram illustrating the individual picture elements or pixels of an image which is tiled.

FIG. 5 is a figurative block diagram illustrating the individual picture elements or pixels of an image 501 which is tiled. The size of the image 501, shown as M×N, depends upon the frame resolution, where "M" is an integer defining the number of pixel rows of the image and "N" is an integer defining the number of columns, or the number of pixels in a row (i.e., each row includes N pixels and the image 501 includes M rows of N pixels each). For a CIF configuration with a frame size of 352×288, for example, N=352 and M=288. Other frame sizes are contemplated where it is understood that the present invention is not limited to any particular frame resolution. The M×N image 501 is sub-divided into multiple "tiles", where one or more tiles are loaded into the tile buffer 201 for processing. As shown, the upper left corner of the image 501 forms a first tile 503 of the image 501, where the size of each tile is generally uniform throughout the image 501. Also shown is a second tile 505 immediately adjacent the first tile 503 in the horizontal direction and including the same number rows of the image 501. The image 501 is subdivided in similar manner along the top rows up to a last tile 507 along the top of the image 501. A next tile 509 is shown immediately adjacent the first tile 503 in the vertical direction, and the tiles continue in this manner up to a final tile 511 shown at the bottom right corner of the image 501.

The size of each tile depends upon the particular configuration and the size of the tile buffer 201. In a first embodiment, each tile is a 16×16 block of pixels equivalent to a macroblock, which is a basic unit used in MPEG video coding scheme. In another embodiment, each tile is a 32×32 block of pixels (including four macroblocks). The 16×16 or 32×32 configurations are square configurations in which the number of pixel rows is equal to the number of pixel columns. It is noted, however, that the shape of each tile may be other than a square or rectangular block of pixels. In another embodiment, for example, each tile includes all of the pixels of each of a certain number of rows (e.g., including all of the top tiles 503, 505, . . . , 507). The tile buffer 201 may be configured from one to any suitable number of tiles up to the entire image 501. As previously noted, the larger the high frequency or binarization image that is used for motion estimation, the more accurate the determination of the GMV and thus the more successful the motion stabilization process. Thus, the tile buffer 201 is made as large as possible depending upon the particular application. The pixels of the DV' signal are loaded into the tile buffer 201 and processing begins when a sufficient number of pixels have been received. Processing and loading continues in this manner for each frame received by the image sensor 103.

Figure 6:
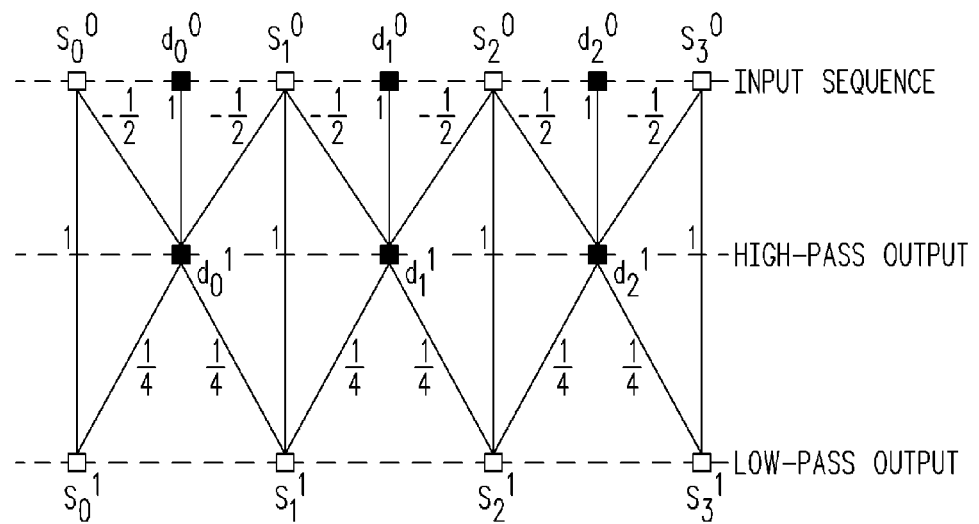
FIG. 6 is a simplified functional block diagram of an exemplary 5/3 discrete wavelet transformation (DWT) filter which is used as the filter bank of FIG. 2 in one embodiment.

FIG. 6 is a simplified functional block diagram of an exemplary 5/3 discrete wavelet transformation (DWT) filter 600, which is used as the filter bank 203 in one embodiment. And the DWT filter 600 may also be used as the filter bank 309. The top row of squares represents the input sequence to the DWT filter 600, which includes a consecutive set of input values, such as the consecutive pixel values of a pixel row of the image 501. The second row of squares of the DWT filter 600 represents the high-pass output and the third row of squares represents the low-pass output of the DWT filter 600. It is noted that in a multi-level filter bank, the output of one set of processed sub-bands may be provided to the input of another level filter bank so that the input sequence for the next level may not be pixel values. Each pair of input values along the first row are labeled "s" and "d", respectively, where the s input values are the even-numbered inputs and the d input values are the odd-numbered inputs. For the input sequence, the superscript denotes the row and the subscript denotes each sequential pair, so that the input sequence is as follows: $s_0^0$, $d_0^0$, $s_1^0$, $d_1^0$, $s_2^0$, $d_2^0$, and so on. The second row of squares represents the high-pass output in which each square is labeled as "d" with a superscript denoting the row (of high-pass values) and a subscript denoting each sequential value in the respective row, so that the sequence for the first row is as follows: $d_0^1$, $d_1^1$, $d_2^1$, and so on, for the first row of high-pass values. The third row of squares represents the low-pass output in which each square is labeled as "s" with a superscript denoting the row (of low-pass values) and the subscript denoting each sequential value in the respective row, so that the sequence is as follows: $s_0^1$, $S_1^1$, $s_2^1$, $s_3^1$, and so on, for the first row of low-pass values. A solid line (vertical and diagonal lines) between adjacent squares with a number denotes a coefficient of the filter.

As known by those skilled in the art, for the case of a 5×3 Wavelet in lifting scheme, each high-pass value is determined according to the following equation (1):

$$d_i^1 = d_i^0 - \frac{1}{2}(s_i^0 + s_{i+1}^0) \tag{1}$$

in which subscript "i" is an integer index value denoting sequential values of each row of input and output values. Each low-pass value is determined according to the following equation (2):

$$s_i^1 = s_i^0 + \frac{1}{4}(d_{i-1}^1 + d_i^1) \tag{2}$$

in which subscript "i" is an integer index value denoting sequential values in each row of input and output values. For example, the first high-pass value $d_0^1$ is determined using the first three input values $s_0^0$, $d_0^0$ and $s_1^0$ as $d_0^1 = d_0^0 - \frac{1}{2}(s_0^0 + s_1^0)$. Similarly, the first low-pass value $s_0^1$ is determined using the first high-pass value $d_0^1$ as $s_0^0 = s_0^0 + \frac{1}{4}(0 + d_0^1)$, where $d_{i-1}^1$ for i=0 is assumed to be zero. Each next high-pass value and low-pass value may be determined when the next pair of input values are received until the first row of high-pass and low-pass values is determined. Subsequent rows of high-pass and low-pass values are determined in the same manner with each new row of input values.

The configuration of the DWT filter 600 provides several advantages. A filter with only 5 taps for low-pass and 3 taps for high-pass filter requires low memory access. Also, the amount of computation incurred is very low because of the short length of the filter taps and since the coefficients of the DWT circuit 600 are powers of two. In this manner, the coefficients, which appear as multipliers according to equations (1) and (2), do not require digital multiplication but instead may be implemented using a shift function and digital negation. It is noted that the more complicated filters, such as 9/7 wavelet filter, or specially designed wavelet transforms or filter banks, may achieve better results while introducing more computational complexity overhead.

In general, the tiled image of a video sequence (either received directly from the image sensor 103 or after any appropriate image signal processing steps) is filtered using sub-band image information. The generation of sub-band image information is performed by using a filter bank (e.g., filter bank 203 and/or 309), which can be applied to the tile as a one-dimensional (1-D) separable transform or a two-dimensional (2-D) transformation. Depending on the size of the image (e.g., the spatial resolution) and the trade-off between tile buffer size (and thus the memory used for the motion processing functions), the level of processing and performance, and the desired processing throughput, either a one-level or a multi-level filter bank is used. In one embodiment, the high frequency sub-band output resulting from the filtering process of the filter bank significantly reduces the amount of information to be stored and processed for motion estimation, motion decision and motion compensation without reducing the accuracy of the stabilization processing. Any number of levels may be used during the filtering process, such as, for example, the high frequency sub-band(s) resulting from one level of filtering (HH) or from two levels of filtering (HHHH) yielding diagonal information, and so on. As known to those skilled in the art, other sub-bands which also contain high frequency information, such as sub-bands HL and LH, may be used in addition to (or instead of) the high frequency sub-bands, HH, HHHH for the HFSB signal. The same holds true for their spatially dual sub-bands resulting from higher levels. A multi-level filter bank is particularly advantageous for larger special resolutions applications and/or for those applications in which the buffer size is to be reduced as much as possible. A 1-D H sub-band resulting from a single level process in which the one-dimensional separable transform has either been applied to the rows or columns of the tiled image 501 (or an I-frame) of a video sequence may also be used as the HFSB signal.

The IS logic 107 provides several advantages over conventional motion stabilization schemes. The filter bank 203 reduces the information used for motion estimation by filtering out low frequency information and providing a decimated pass frequency sub-band of the input video information. Furthermore, the edge detection process is simplified and more accurate since performed only on the high frequency sub-band information. And the binarized edge information significantly reduces computational overhead for motion estimation. Thus, motion estimation is achieved without having to store an entire reference frame, which might otherwise require a prohibitive amount of memory for high-resolution configurations (e.g., frame size greater than 3 megapixels). The memory requirement is therefore significantly reduced by using the decimated high frequency sub-band information rather than the entire frame information, and may be reduced even further by binarization. Motion compensation computational complexity is also significantly reduced using the high frequency sub-band information. Edge detection for a system according to the present invention becomes significantly easier to do and achieves more accurate results by filtering to retain only the high frequency information. Binarization significantly reduces the amount of information to be processed for motion; motion detection may be achieved using simple logical operations. And the motion detection, compensation and estimation processes are performed using a reduced amount of information rather than an entire frame, thereby significantly reducing computational complexity.

In one embodiment, a similar process (e.g., high pass filtering and edge detection binarization) is performed on the stabilized picture for providing reference pictures used for motion estimation. Alternatively, the high frequency or binarized signal is used to generate the GMV, which is then applied to the high frequency or binarized signal for stabilization. In either case, the IS logic 107 does not depend upon an external motion vector from the downstream video encoder, so that motion estimation is contained within front-end processing. Since computations are contained within the front-end and do not depend upon downstream computations, stabilization is achieved for the current frame and still image capture stabilization is achieved.

In one embodiment, the HFSB output of the filter bank is provided directly to the motion stabilization processor 207, thereby bypassing edge detection and binarization. Edge and binarization processes are performed between filtering and motion stabilization processing to further reduce the amount of information for motion processing. The use of edge detection and binarization provides the most significant amount of reduction of computational complexity of motion estimation.

A motion stabilization system according to an embodiment of the present invention includes a filter bank and motion stabilization logic. The filter bank receives a video signal and provides at least one high frequency sub-band signal which includes edge information of the video signal. The motion stabilization logic receives high frequency sub-band signal, a reference image, and the video signal and provides a stabilized image. The motion stabilization system may include an edge detector which receives and binarizes the high pass sub-band signal. Binarization significantly reduces the amount of information to be processed by the motion stabilization logic. The motion stabilization system may further include a tile buffer which stores a portion of the video signal and which provides a video signal portion to the filter bank. The filter bank may be implemented as a discrete wavelet transformation filter.

The motion stabilization logic may include a motion stabilization processor and an image reference processor. The motion stabilization processor receives the high frequency sub-band signal, the video signal and the reference image and provides the stabilized image. The image reference processor receives image stabilization information from the motion stabilization processor and provides the reference image. The image reference processor may include a second filter bank and an edge detector. The second filter bank receives the stabilized image and provides a stabilized high frequency sub-band signal. The edge detector receives the stabilized high frequency sub-band signal and provides the reference image.

The stabilization processor may include motion estimation logic, motion decision logic and motion compensation logic. In one embodiment, the motion estimation logic receives the high frequency sub-band signal and the reference image and provides multiple motion vectors. The motion decision logic receives the motion vectors and provides a global motion vector. The motion compensation logic receives the global motion vector and the video signal and provides the stabilized image. The image reference processor may include second motion compensation logic which receives the global motion vector and the high frequency sub-band signal and which provides the reference image.

An image processing system according to an embodiment of the present invention includes an image sensor which provides a digital video signal and a motion stabilization system. The motion stabilization system includes a filter bank, a motion stabilization processing circuit and an image reference processing circuit. The filter bank has an input receiving the digital video signal and an output providing a high frequency sub-band signal including edge information. The motion stabilization processing circuit has a first input receiving the high frequency sub-band signal, a second input receiving the digital video signal, a third input receiving a reference image, and an output providing a stabilized image. The image reference processing circuit has an input coupled to the motion stabilization processing circuit for receiving image stabilization information and an output providing the reference image.

The motion stabilization system may further contain an edge detector having an input receiving the high frequency sub-band signal and an output providing a binarized high frequency sub-band signal to the first input of the motion stabilization processing circuit. The motion stabilization system may further include a tile buffer which stores a portion of the digital video signal and which has an output coupled to the input of the filter bank. The filter bank may be implemented as a discrete wavelet transformation filter.

The image reference processing circuit may include a second filter bank and an edge detector. The second filter bank has an input receiving the stabilized image and an output providing a stabilized high frequency sub-band signal. The edge detector has an input receiving the stabilized high frequency sub-band signal and an output providing the reference image.

The motion stabilization processing circuit may include a motion estimation circuit, a motion decision circuit and a motion compensation circuit. The motion estimation circuit has an input receiving the high frequency sub-band signal, a second input receiving the reference image, and an output which provides motion vectors. The motion decision circuit has an input receiving the motion vectors and an output providing a global motion vector. The motion compensation circuit has a first input receiving the global motion vector, a second input receiving the digital video signal, and an output providing the stabilized image. The image reference processing circuit may include a second motion compensation circuit having a first input receiving the global motion vector, a second input receiving the high frequency sub-band signal, and an output providing the reference image.

A method of stabilizing a video signal according to an embodiment of the present invention includes filtering the video signal and providing high frequency information, processing motion of the high frequency information to provide stabilization information including a stabilized image, and processing the stabilization information to provide reference information used for processing motion. The method may include tiling the video signal. The method may include edge detecting and binarizing the high frequency information. The method may include high pass filtering the stabilized image to provide stabilized high frequency information. The method may include edge detecting and binarizing the stabilized high frequency information. The method may include estimating motion based on the high frequency information and the reference information to provide motion vectors, determining a global motion vector based on the motion vectors, and performing motion compensation on the video signal using the global motion vector to provide the stabilized image. The method may include performing motion compensation on the high frequency information using the global motion vector to provide the reference information.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A motion stabilization system, comprising:
    a filter bank which receives a video signal and which provides at least one high frequency sub-band signal including edge information of said video signal; and
    motion stabilization logic which receives said at least one high frequency sub-band signal, a reference image, and said video signal and which provides a stabilized image.

2. The motion stabilization system of claim 1, further comprising an edge detector which receives and binarizes said at least one high frequency sub-band signal.

3. The motion stabilization system of claim 1, further comprising a tile buffer which stores a portion of said video signal and which provides said portion of said video signal to said filter bank.

4. The motion stabilization system of claim 1, wherein said filter bank comprises a discrete wavelet transformation filter.

5. The motion stabilization system of claim 1, wherein said motion stabilization logic comprises:
    a motion stabilization processor which receives said high frequency sub-band signal, said video signal and said reference image and which provides said stabilized image; and
    an image reference processor which receives image stabilization information from said motion stabilization processor and which provides said reference image.

6. The motion stabilization system of claim 5, wherein said image reference processor comprises:
    a second filter bank which receives said stabilized image and which provides a stabilized high frequency sub-band signal; and
    an edge detector which receives said stabilized high frequency sub-band signal and which provides said reference image.

7. The motion stabilization system of claim 5, wherein said motion stabilization processor comprises:
    motion estimation logic which receives said at least one high frequency sub-band signal and said reference image and which provides a plurality of motion vectors;
    motion decision logic which receives said plurality of motion vectors and which provides a global motion vector; and
    first motion compensation logic which receives said global motion vector and said video signal and which provides said stabilized image.

8. The motion stabilization system of claim 7, wherein said image reference processor comprises second motion compensation logic which receives said global motion vector and said at least one high frequency sub-band signal and which provides said reference image.

9. An image processing system, comprising:
an image sensor providing a digital video signal; and
a motion stabilization system, comprising:
  a filter bank having an input receiving said digital video signal and an output providing a high frequency sub-band signal including edge information;
  a motion stabilization processing circuit having a first input receiving said high frequency sub-band signal, a second input receiving said digital video signal, a third input receiving a reference image, and an output providing a stabilized image; and
  an image reference processing circuit having an input coupled to said motion stabilization processing circuit for receiving image stabilization information and an output providing said reference image.

10. The image processing system of claim 9, wherein said motion stabilization system further comprises an edge detector having an input receiving said high frequency sub-band signal and an output providing a binarized high frequency sub-band signal to said first input of said motion stabilization processing circuit.

11. The image processing system of claim 9, wherein said motion stabilization system further comprises a tile buffer which stores a portion of said digital video signal and which has an output coupled to said input of said filter bank.

12. The image processing system of claim 9, wherein said filter bank comprises a discrete wavelet transformation filter.

13. The image processing system of claim 9, wherein said image reference processing circuit comprises:
  a second filter bank having an input receiving said stabilized image and an output providing a stabilized high frequency sub-band signal; and
  an edge detector having an input receiving said stabilized high frequency sub-band signal and an output providing said reference image.

14. The image processing system of claim 9, wherein said motion stabilization processing circuit comprises:
  a motion estimation circuit having an input receiving said high frequency sub-band signal, a second input receiving said reference image, and an output which provides a plurality of motion vectors;
  a motion decision circuit having an input receiving said plurality of motion vectors and an output providing a global motion vector; and
  a first motion compensation circuit having a first input receiving said global motion vector, a second input receiving said digital video signal, and an output providing said stabilized image.

15. The image processing system of claim 14, wherein said image reference processing circuit comprises a second motion compensation circuit having a first input receiving said global motion vector, a second input receiving said high frequency sub-band signal, and an output providing said reference image.

16. A method of stabilizing a video signal, comprising:
filtering the video signal and providing high frequency information;
processing motion of the high frequency information to provide stabilization information including a stabilized image; and
processing the stabilization information to provide reference information used for said processing motion.

17. The method of claim 16, further comprising tiling the video signal.

18. The method of claim 16, further comprising edge detecting and binarizing the high frequency information.

19. The method of claim 16, wherein said processing the stabilization information comprises high pass filtering the stabilized image to provide stabilized high frequency information.

20. The method of claim 19, wherein said processing the stabilization information further comprises edge detecting and binarizing the stabilized high frequency information.

21. The method of claim 16, wherein said processing motion of the high frequency information comprises:
estimating motion based on the high frequency information and the reference information to provide a plurality of motion vectors;
determining a global motion vector based on the plurality of motion vectors; and
performing motion compensation on the video signal using the global motion vector to provide the stabilized image.

22. The method of claim 21, wherein said processing the stabilization information comprises performing motion compensation on the high frequency information using the global motion vector to provide the reference information.

* * * * *